US005352112A

United States Patent [19]

Moore

[11] Patent Number: 5,352,112

[45] Date of Patent: Oct. 4, 1994

[54] ROTARY PRESS

[76] Inventor: Frederick J. Moore, c/o British Nuclear Fuels plc, Patents Section, Legal Department, Risley, Warrington, Cheshire WA3 6AS, United Kingdom

[21] Appl. No.: 54,102

[22] Filed: Apr. 8, 1993

Related U.S. Application Data

[63] Continuation of Ser. No. 836,401, Feb. 18, 1992, abandoned.

[30] Foreign Application Priority Data

Apr. 9, 1991 [GB] United Kingdom ................. 9107420

[51] Int. Cl.[5] ............................................. B29C 31/00

[52] U.S. Cl. .................................... 425/352; 222/460; 425/353; 425/147

[58] Field of Search ................ 100/226, 907; 222/285, 222/286, 317, 410, 460, 502, 503; 425/145, 147, 345, 348 R, 352, 353, 354, 355

[56] References Cited

U.S. PATENT DOCUMENTS

| | | | |
|---|---|---|---|
| 2,949,082 | 8/1960 | McCarley | 425/353 |
| 2,992,729 | 7/1961 | Curtius | 425/345 |
| 3,270,079 | 10/1966 | Cohn | 425/345 |
| 3,326,145 | 6/1967 | Austin | 425/353 |
| 3,408,963 | 11/1968 | Alexander, Jr. et al. | 425/355 |
| 3,460,487 | 8/1969 | Kibbe | 425/345 |
| 3,910,739 | 10/1975 | Talis et al. | 425/345 |
| 4,108,338 | 8/1978 | Howland et al. | 425/353 |
| 4,157,148 | 6/1979 | White | 425/345 |

FOREIGN PATENT DOCUMENTS

| | | | |
|---|---|---|---|
| 1050878 | 10/1983 | U.S.S.R. | 425/348 R |
| 1189684 | 11/1985 | U.S.S.R. | 425/353 |
| 874004 | 8/1961 | United Kingdom . | |
| 923603 | 4/1963 | United Kingdom . | |

*Primary Examiner*—Charles S. Bushey

[57] ABSTRACT

A rotary press having a dispensing device for dispensing granular material on to a rotary table. The dispensing device has a frame located on the table and into which granular material is discharged from a discharge port connected to a vessel containing the granular material. The vessel and thereby the discharge port is arranged to be raised or lowered by a drive unit so as to vary the feed of the granular material from the discharge port into the frame. Guide fingers projecting internally from the frame guide the granular material into a die cavity as the table rotates.

6 Claims, 1 Drawing Sheet

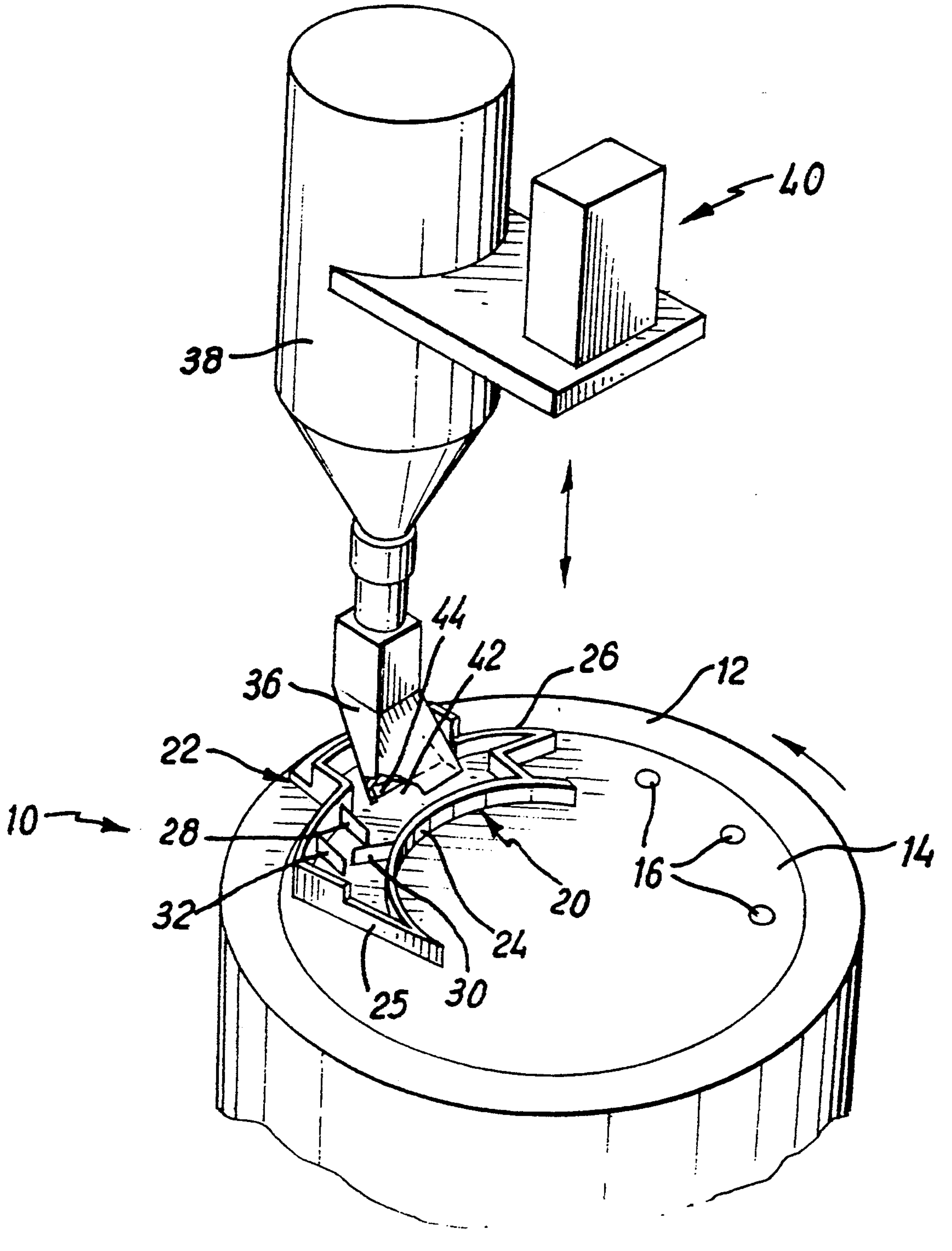
40
38
44
42
26
36
12
22
10
28
16
14
32
20
24
30
25

ROTARY PRESS

This is a division of application Ser. No. 07/836,401 filed Feb. 18, 1992, now abandoned.

FIELD OF THE INVENTION

This invention relates to a rotary press, and more particularly to a rotary press in which granular material can be compacted. As used herein the term "granular material" includes powdered material as well as relatively large grains of material.

BACKGROUND OF THE INVENTION

When feeding granular material with poor flow characteristics into dies of a rotary press, difficulties are usually encountered in ensuring uniform filling of the dies. It may be difficult to maintain a uniform feed rate of granular material on to the table of the rotary press. Spillage and wastage of the granular material, or underfilling of the die may result. This can lead to variable filling of the die with variations in density of the compacted granular material.

SUMMARY OF THE INVENTION

According to the present invention in one aspect, in a rotary press having a rotatable table defining die cavities therein, there is provided a dispensing device for dispensing granular material on to the table, the device comprising a vessel for retaining the granular material, a discharge port connectable to the vessel for discharging the granular material from the vessel, a frame located above and close to the table, the discharge port being located so as to discharge into the frame, guide means located inside the frame for guiding the granular material in the frame into said die cavities as the table rotates, and means for raising and lowering the discharge port so as to vary the feed of the granular material on to the table, the guide means comprising a plurality of unconnected guide fingers projecting angularly from the frame including a first finger which points toward a second finger which in turn points toward a third finger, whereby granular material deposited on the table is transported by rotation of the table against the fingers and is thereby guided by the fingers into the die cavities.

According to the invention in another aspect, there is provided a rotary press having a rotatable table defining die cavities therein, wherein the improvement comprises a dispensing device for dispensing granular material onto the table, the device comprising a vessel for retaining the granular material, a discharge port defining a rectangular discharge opening for discharging the granular material from the vessel, a frusto-conical portion connecting the vessel to the discharge port, a frame located above and close to the table, the frame being shaped so as to define opposed curved sides which lie, at least in part, on circles coaxial with the table, and the frame having a leading end of stepped configuration, the leading end being higher toward the radially outer part thereof so as to inhibit spillage of the granular material as the table rotates in a direction toward the leading end, the discharge port being located so as to discharge into the frame, guide means located inside the frame for guiding the granular material in the frame into the die cavities as the table rotates, the guide means comprising a plurality of unconnected guide fingers projecting angularly from the frame close to the surface of the table, each finger extending from one curved side of the frame and terminating short of the opposing curved side, the fingers being relatively located and oriented so as to cause the granular material which is swept across the fingers to flow from one finger to another finger in a generally sinuous manner across and into the die cavities, and means for raising and lowering the vessel and thereby the discharge port so as to vary the feed of the granular material from the discharge opening onto the table, the raising and lowering means comprising an electric drive unit.

The invention has particular advantages for feeding uranium dioxide powder (e.g. between 2 and 7 microns mean particle size). Use of the invention enables the flow of the granular material from the discharge port to be controlled by appropriate raising or lowering of the discharge port.

BRIEF DESCRIPTION OF THE DRAWING

The invention will now be further described with reference to the accompanying drawing which shows a perspective representation of part of a rotary press.

DESCRIPTION OF PREFERRED EMBODIMENTS

Referring now to the FIGURE, part of a rotary press 10 is shown having a body 12 and a rotatable table 14 with a number of die cavities 16 therein (only three are shown) spaced on a pitch circle co-axial with the table 14. A frame 20 is secured to the body 12 at 22 and is held above but close to the top of the table 14 such that the die cavities 16 pass under the frame 20 when the table 14 rotates. The frame 20 has curved outer sides 24, 26 respectively which lie on circles co-axial with the axis of the table 14. Guide fingers 28, 30, 32 respectively secured at one end to the inside of the frame 20 project angularly from the frame 20 close to the surface of the table 14. An end 25 of the frame 20 is stepped to inhibit spillage of granular material in use of the press 10.

A discharge port 36 from a frusto-conical portion of vessel 38 is positioned so as to discharge into the frame 20. The vessel 38 with the associated discharge port 36 is adjustable in a direction normal to the table 14 under the action of an electric drive unit 40 mounted at the side of the vessel 38. The drive unit 40 is of conventional form, and incorporates, for example, a lead screw (not shown) to effect the movement of the vessel 38. The discharge port 36 has a rectangular opening 42 from a sloping rear wall 44.

In use of the press 10, granular material (eg uranium dioxide powder of mean particle size of between 2 to 7 microns) is loaded into the vessel 38 and is discharged through the opening 42 of the discharge port 36 inside the frame 20. The table 14 rotates as the dies 16 are brought in turn under a ram (not shown) of the press 10. In doing so the granular material is swept inside the frame 20 against the fingers 28, 30, 32 which break up any granular material that binds and might bridge across a die cavity 16, and thereby-ensures a more consistent filling of the dies 16.

The height of the opening 42 above the table 14 determines the amount of granular material that flows through the opening 42 on to the table 14. Hence, the flow of the granular material can be increased or decreased by use of the drive unit 40 to adjust the height of the vessel 38 and the discharge port 36.

The invention has particular advantages for use with extremely fine powders, or for presses having dies with large depth of fill to diameter ratios or for producing annular products with thin wall sections.

Although the invention has been described in relation to the use of uranium dioxide powder, it may be used with other granular materials having poor flow characteristics.

I claim:

1. A rotary press having a rotatable table defining die cavities therein, wherein the improvement comprises a dispensing device for dispensing granular material onto the table, the device comprising a vessel for retaining the granular material, a discharge port connectable to the vessel for discharging the granular material from the vessel, a frame located above and close to the table, the discharge port being located so as to discharge into the frame, guide means located inside the frame for guiding the granular material in the frame into said die cavities as the table rotates, and means for raising and lowering the discharge port so as to vary the feed of the granular material onto the table, the guide means comprising a plurality of unconnected guide fingers projecting angularly from the frame including a first finger which points towards a second finger which in turn points towards a third finger, whereby granular material deposited on the table is transported by rotation of the table against the fingers and is thereby guided by the fingers into the die cavities.

2. A press as claimed in claim 1, wherein the frame is shaped to define opposing curved sides which lie, at least in part, on circles coaxial with the table.

3. A press as claimed in claim 2, wherein the frame has a leading end of stepped configuration, the leading end being higher towards the radially outer part thereof so as to inhibit spillage of the granular material as the table rotates in a direction towards said leading end.

4. A press as claimed in claim 3, wherein the discharge port has a rectangular-shaped discharge opening and a sloping rear wall of the discharge port defines one side of the discharge opening.

5. A press as claimed in claim 1 wherein said vessel contains granular material in the form of a powder comprising uranium dioxide of mean particle size between 2 and 7 microns.

6. A rotary press having a rotatable table defining die cavities therein, wherein the improvement comprises a dispensing device for dispensing granular material onto the table, the device comprising a vessel for retaining the granular material, a discharge port defining a rectangular discharge opening for discharging the granular material from the vessel, a frusto-conical portion connecting the vessel to the discharge port, a frame located above and close to the table, the frame being shaped so as to define opposing curved sides which lie, at least in part, on circles coaxial with the table, and the frame having a leading end of stepped configuration, the leading end being higher towards the radially outer part thereof so as to inhibit spillage of the granular material as the table rotates in a direction towards said leading end, the discharge port being located so as to discharge into the frame, guide means located inside the frame for guiding the granular material in the frame into said die cavities as the table rotates, said guide means comprising a plurality of unconnected guide fingers projecting angularly from the frame close to the surface of the table, each finger extending from one curved side of the frame and terminating short of the opposing curved side, at least one such finger extending from each curved side, the fingers being relatively located and oriented so as to cause the granular material which is swept against the fingers to flow from one finger to another finger in a generally sinuous manner across and into said die cavities, and means for raising and lowering the vessel and thereby the discharge port so as to vary the feed of the granular material from the discharge opening onto the table, said raising and lowering means comprising an electric drive unit.

* * * * *